(12) United States Patent
Birkestrand et al.

(10) Patent No.: US 7,958,218 B2
(45) Date of Patent: *Jun. 7, 2011

(54) SYSTEM FOR DETERMINING UNRETURNED STANDBY RESOURCE USAGE

(75) Inventors: Daniel Charles Birkestrand, Rochester, MN (US); Randall Lane Grimm, Rochester, MN (US); David Otto Lewis, Rochester, MN (US); Terry Lyle Schardt, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 718 days.

This patent is subject to a terminal disclaimer.

(21) Appl. No.: 11/970,789

(22) Filed: Jan. 8, 2008

(65) Prior Publication Data

US 2008/0109805 A1 May 8, 2008

Related U.S. Application Data

(63) Continuation of application No. 11/877,080, filed on Oct. 23, 2007, now Pat. No. 7,574,507, which is a continuation of application No. 10/424,636, filed on Apr. 25, 2003, now Pat. No. 7,395,334.

(51) Int. Cl.
G06F 15/16 (2006.01)

(52) U.S. Cl. ........ 709/223; 709/224; 709/225; 709/229; 709/231; 713/155; 713/189; 713/193; 715/778; 705/52; 705/53; 705/54; 705/58; 705/59

(58) Field of Classification Search .......... 709/223–229, 709/233, 231
See application file for complete search history.

(56) References Cited

U.S. PATENT DOCUMENTS

| | | | |
|---|---|---|---|
| 5,745,879 A | 4/1998 | Wyman | |
| 5,845,281 A | 12/1998 | Benson et al. | |
| 5,982,891 A | 11/1999 | Ginter et al. | |
| 6,009,473 A | 12/1999 | Lowe | |
| 6,684,210 B1 | 1/2004 | Takechi et al. | |
| 6,828,991 B2 | 12/2004 | Nason et al. | |
| 7,073,073 B1 | 7/2006 | Nonaka et al. | |
| 7,395,334 B2 * | 7/2008 | Birkestrand et al. | 709/225 |
| 7,574,507 B2 * | 8/2009 | Birkestrand et al. | 709/225 |
| 2004/0199473 A1 | 10/2004 | Birkestrand et al. | |
| 2004/0236852 A1 | 11/2004 | Birkestrand et al. | |

FOREIGN PATENT DOCUMENTS
WO    WO 02/39671 A2    5/2002

OTHER PUBLICATIONS

U.S. Patent and Trademark Office, Office Action issued in related U.S. Appl. No. 10/424,636, dated Nov. 21, 2006 (18 pages).
U.S. Patent and Trademark Office, Office Action issued in related U.S. Appl. No. 10/424,636, dated May 7, 2007 (17 pages).

(Continued)

*Primary Examiner* — Jude J Jean Gilles
(74) *Attorney, Agent, or Firm* — Wood, Herron & Evans, LLP; James R. Nock

(57) ABSTRACT

An apparatus, program product and method for determining unreturned standby resource usage. Unreturned standby resource data is monitored and stored separately from other standby resource data for billing and other accounting purposes.

14 Claims, 6 Drawing Sheets

OTHER PUBLICATIONS

U.S. Patent and Trademark Office, Office Action issued in related U.S. Appl. No. 10/424,636, dated Sep. 19, 2007 (7 pages).

U.S. Patent and Trademark Office, Office Action issued in related U.S. Appl. No. 11/877,080, dated Sep. 22, 2008 (7 pages).

U.S. Patent and Trademark Office, Office Action issued in related U.S. Appl. No. 11/877,080, dated Apr. 6, 2009 (4 pages).

J.Jann et al., "Web applications and dynamic reconfiguration in UNIX servers," Mar. 6, 2003, http://ieexplore.iee.org/xpl/absprintf.jsp?arnumber=1190245&page=FREE.

"Sun Enterprise 10000 Capacity on Demand 1.0 Administrator Guide," XP-002319318, Oct. 1999.

"IBM eserver iSeries—Versatile, Multi-Environment Servers for the Era of e-business on demand™," Jan. 2003.

* cited by examiner

FIG. 4

| NUMBER OF PROCESSORS: | 8 | —302 |
| STANDBY PROCESSORS REQUESTED: | 3 | —304 |
| PROCESSOR DAYS REQUESTED: | 10 | —305 |
| STANDBY PROCESSORS AVAILABLE: | 7 | —306 |
| HISTORY OF REQUESTS & PROCESSOR DAYS: | 334 | —308 |
| HISTORY OF UNRETURNED PROCESSOR DAYS: | 0 | —310 |

| PARTITION ID: | PRIMARY | —402 |
| NUMBER OF PARTITION PROCESSORS: | 6 | —404 |
| MINIMUM DESIGNATION: | 3 | —406 |
| SHARED PROCESSOR POOL: | NO | —408 |
| PARTITION SIZE (MB): | 277 | —410 |

| NUMBER OF PROCESSORS: | 8 | —602 |
| NUMBER OF UNRETURNED PROCESSORS: | 3 | —604 |
| STANDBY PROCESSORS AVAILABLE: | 0 | —608 |
| HISTORY OF REQUESTED PROCESSOR DAYS: | 311 | —610 |
| HISTORY OF UNRETURNED PROCESSOR DAYS: | 52 | —612 |
| SYSTEM SERIAL NUMBER: | 10-12345 | —614 |
| TYPE: | 9406 | —615 |

600

SYSTEM FOR DETERMINING UNRETURNED STANDBY RESOURCE USAGE

CROSS-REFERENCE TO RELATED APPLICATIONS

This application is a continuation of U.S. patent application Ser. No. 11/877,080 filed on Oct. 23, 2007 by Daniel Charles Birkestrand et al. (ROC920030109US2), which is a continuation of U.S. patent application Ser. No. 10/424,636 filed on Apr. 25, 2003 by Daniel Charles Birkestrand et al. (ROC920030109US1), the entire disclosures of which are incorporated by reference herein.

FIELD OF THE INVENTION

The present invention relates to computing systems, and more particularly, to managing temporary resources within a data processing environment.

BACKGROUND OF THE INVENTION

Computer resource requirements for commercial and government applications often increase or otherwise fluctuate over time. For instance, a business may experience periods of peak activity that exceed comparable processing or memory requirements of other periods. In another scenario, sales or employee growth may similarly burden existing computing resources with increased requirements. When faced with these increased resource demands, a user would conventionally have to purchase new hardware resources capable of accommodating the elevated computing needs. Such purchase requirements can represent a major, if not preclusive, expenditure for a user, who may have insufficient capital or time to react to rapid growth requirements.

To this end, computing architectures such as the "capacity on demand" design, developed by International Business Machines Corporation, allow customers to effectively "rent" resources such as processors on an as-needed basis. More particularly, a customer may temporarily enable standby processors that are initially dormant within their machine. Where desired, the standby processors are not included in the up front, baseline cost of the machine. As such, for a relatively smaller initial capital investment, a customer may activate and deactivate standby processors as needed for a fee.

When enabled in a virtual processor environment, the standby processors are often shared among multiple processes. Such environments conventionally rely upon a single computing machine having one or more physical controllers, or central processing units (CPUs), to include both dedicated and activated standby processors. As such, active standby processors may execute software configured to simulate multiple, virtual processors.

Some multiprocessor environments support the conceptual practice of logical partitioning. Partitioning practices allow a single machine to simulate the functions of multiple, virtual computers. More particularly, each logical partition provides a programmed architecture suited for assignment and sharing of computing assets with other partitions. For instance, a partition may logically comprise a portion of a standby or dedicated processor, in addition to memory and other resources assigned by an administrator. As such, an administrator may allocate the same standby processor to more than one partition. Each partition may additionally host an operating system, in addition to multiple virtual processors. In this manner, each partition operates largely as if it is a separate computer.

In principle, each virtual processor enabled by a standby processor may access many of the physical resources of the underlying physical machine. Exemplary resources may include memory assets and hardware registers. Virtual processors may additionally share a priority scheme or schedule that partially dictates allocation of processing cycles as between different virtual processors. An underlying program called a partition manager, may use this scheme to assign and dispatch standby and baseline processors to each virtual processor. For instance, the partition manager may intercept requests for resources from operating systems to globally share and allocate the resources.

In this manner, virtual processors act as logical threads of execution for a host partition. As such, the virtual processors can separately execute instructions, while sharing a single standby processor, for instance. By duplicating the utilization of standby processors and other physical assets, a partitioned environment can promote better performance and efficiency. The programmable flexibility of partitions may further allow them to respond to changes in load dynamically without rebooting. For example, each of two partitions containing ten virtual processors may take over all ten available standby and baseline processors of a shared physical system as workload shifts, and without requiring a re-boot or operator intervention.

In such context, selective utilization of standby processors can thus provide customers with another layer of customized processor access and optimized usage. Conversely, capacity on demand systems supply system providers with a creative way to satisfy customer performance and cost requirements, while additionally providing an increased revenue source.

To this end, the customer's use of the standby processors must be monitored for billing and other accountability purposes. However, one problem that has arisen in connection with accounting for standby resources usage is that of addressing usages that exceed allotted limits. For instance, a situation may arise where it is impossible or undesirable to reclaim a standby processor within its prescribed window of activity. Such a scenario might arise where reclaiming the standby processor would affect an inviolate system requirement. Consequently, supervisory mechanisms are needed so that the billing company can properly account for unreturned standby processors. It may be desired, for example, to charge a higher fee for unreturned standby processors than for those reclaimed within a contractually stipulated time. Other considerations regard how unreturned standby processors should be reclaimed, if at all, when used in excess of the contracted time. There is thus a need for an improved manner of determining unreturned processor and other computer resource usage.

SUMMARY OF THE INVENTION

One embodiment consistent with the principles of the present invention includes an apparatus, method, and program product configured to determine usage of an unreturned resource within a capacity on demand data processing system. In one sense, practices consistent with the present invention determine and store unreturned resource usage data. The unreturned usage data is stored separately from expected usage data associated with those resources that are returned within a specified contractual window. Such distinction permits separate processing of the unreturned resource usage data, translating into improved billing and other accounting practices.

In arriving at the desired unreturned resource usage output, usage data for both unreturned and returned standby resources is initially determined. For instance, a count tracking unreturned resource usage data may be initiated in response to a standby resource operating outside of its specified window of activity. "Window of activity" refers generally to the expected or contracted usage of a resource. The count may increment each time a measurable billing occurrence is detected. An exemplary such occurrence may include one billing day. Where so configured, program code consistent with the invention may sample the count from memory to determine unreturned resource status, and/or to affect subsequent or current standby resource access. For example, the program code may restrict activation of a second standby resource where a first is unreturned. Other program code consistent with the invention may determine unreturned resource usage without interrupting standby resource activity.

In any case, the unreturned resource usage data may then be processed separately from the expected resource usage data. For example, the unreturned resource data may be billed out at a different rate than other usage data. Such processed unreturned usage data may also be communicated to a billing computer of a provider for purposes of generating an appropriate invoice.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 4 is a display configured to receive a standby resource request initiated in the flowchart of FIG. 3.

FIG. 5 is a display configured to assign standby resources to the partitions of FIG. 2 according to the processes of the flowchart of FIG. 3.

FIG. 7 is an exemplary report processed by a billing computer of FIG. 1 in connection with method steps of the flowchart of FIG. 6.

DETAILED DESCRIPTION

An embodiment of the present invention may include an apparatus, program product and method for determining unreturned standby resource usage. In one embodiment, processes consistent with the invention monitor, store and otherwise treat unreturned standby usage data separately from other standby resource data. The usage determination may be used for billing and other accounting purposes. Hardware environments suited for execution of such an embodiment are illustrated in FIGS. 1 and 2.

Hardware and Software Environment

Figure 1:
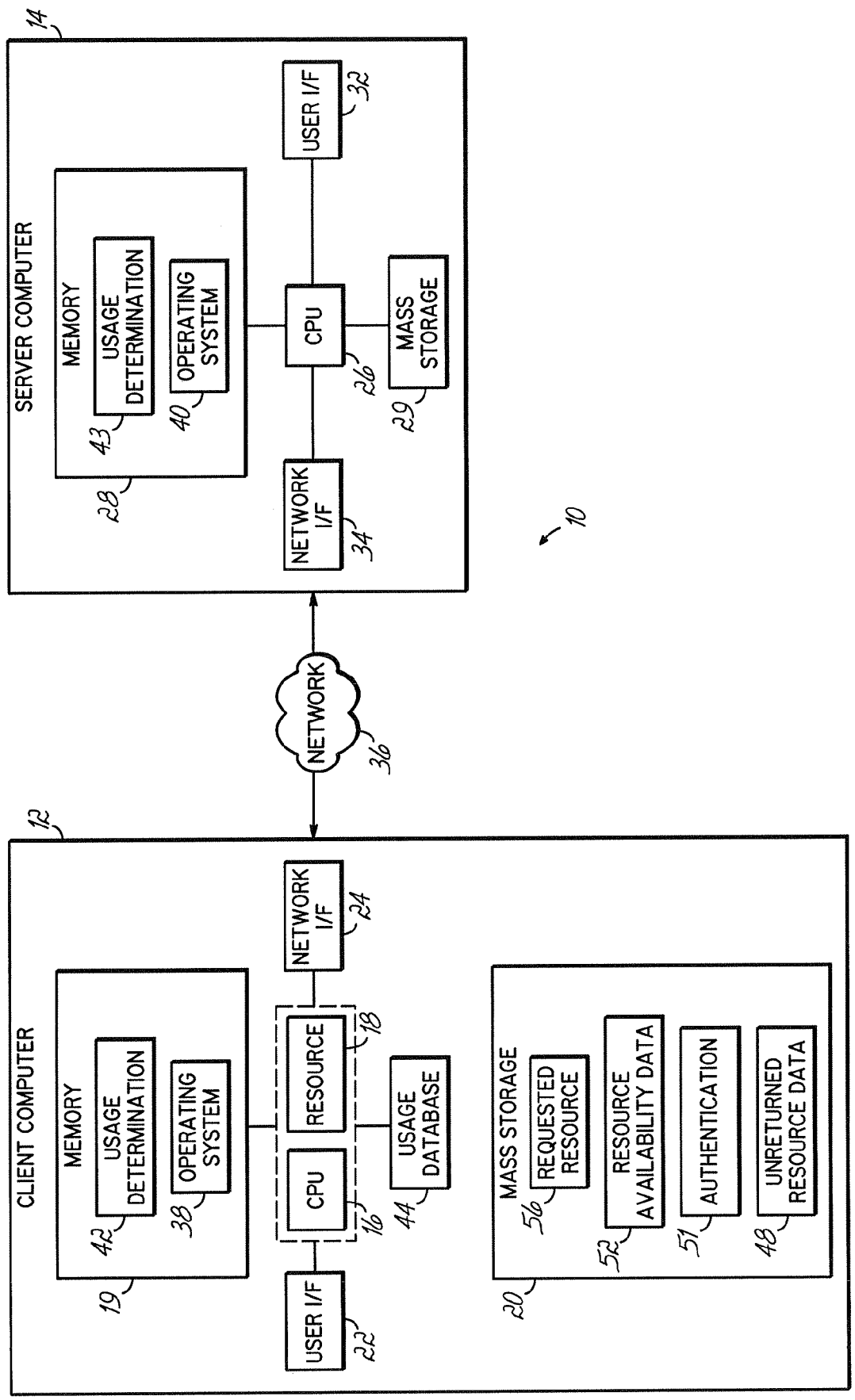
FIG. 1 is a block diagram of a distributed computer system having software consistent with the invention.
Figure 2:
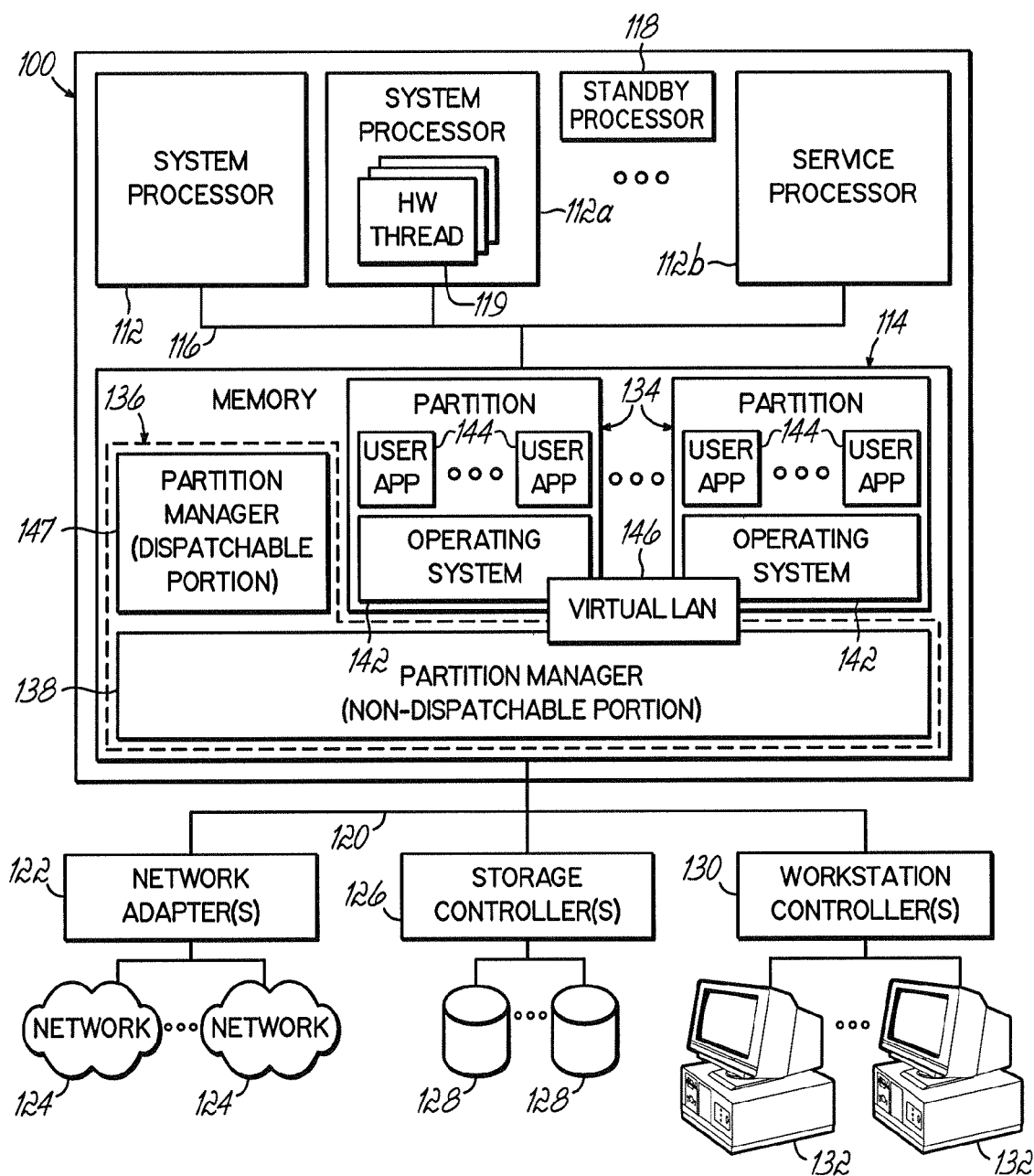
FIG. 2 is a block diagram of the primary software components and resources in the customer computer of FIG. 1.

FIG. 1 illustrates an embodiment of a distributed computer system 10 configured to determine usage of unreturned standby resources 18 in a manner that is consistent with the principles of the present invention. More particularly, the system 10 includes at least one apparatus, e.g., one or more customer computers 12, and one or more billing computers 14. For the purposes of this invention, each computer 12, 14 may represent practically any type of computer, computer system or other programmable electronic device capable of functioning within a distributed and/or a client-server environment. Moreover, each computer 12, 14 may be implemented using one or more networked computers, e.g., in a cluster or other distributed computing system. As is common in many distributed systems, multiple customer computers 12 will typically interface with a given billing computer 14. While more capable computer systems may present advantages in certain embodiments consistent with the principles of the present invention, a suitable billing computer 14 for purposes of this specification may comprise any device configured to receive and process an electronic message transmitted from the customer computer 12.

Customer computer 12 typically includes at least one central processing unit 16, in addition to one or more standby resources 18. As discussed herein, a suitable standby resource that is consistent with the principles of the present invention may include an allocatable component or function of a computing environment. As such, exemplary standby resources may include processors, memory, plugin cards, input/output controllers, adaptors or devices, and other hardware devices, among other components. Resources may also comprise multiple such components, e.g., processor cards including multiple processors coupled to local memory and other components, e.g., for a NUMA-based architecture.

In the illustrated embodiment, standby resource 18 is implemented a processor that is dormant until temporarily activated by a user. In such a case, both the CPU 16 and standby processor 18 may include at least one microprocessor coupled to a memory 19, which may represent the random access memory (RAM) devices comprising the main storage of computer 12, as well as any supplemental levels of memory, e.g., cache memories, non-volatile or backup memories (e.g., programmable or flash memories), read-only memories, etc. For instance, the memory may include program code 42 configured to determine usage of standby resources 18 that have not been returned within a specified window of activity to their dormant state. In addition, memory 19 may be considered to include memory storage physically located elsewhere in computer 12, e.g., any cache memory in a processor in CPU 16 or a smart card, as well as any storage capacity used as a virtual memory, e.g., as stored on a mass storage device 20 or on another computer coupled to computer 12.

Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), smart card and/or a tape drive, among others. An exemplary mass storage may include a register or database 44 that contains usage data generated from stored unreturned resource, requested resource and resource availability files 48, 56 and 52, respectively. As discussed in greater detail below, the system 10 may derive such files 48, 56 and 52 from data recorded during regular operation of the system 10. Of note, one of skill in the art will recognize that the inclusion and distribution of the databases, files and other stored data may be altered substantially while still conforming with the principles of the present invention.

Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

Similar to customer computer 12, billing computer 14 includes a CPU 26, memory 28, mass storage 29, user interface 32 and network interface 34. Moreover, billing computer 14 may comprise multiple computers of both a principle/lessor, as well as that of an agent/licensee.

Computers 12, 14 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet. Such an arrangement facilitates ready access to information stored on the customer computer 12, as well as timely notifications and program updates.

Each computer 12, 14 operates under the control of an operating system 38, 40 and executes or otherwise relies upon various computer software applications, components, programs, objects, modules, data structures, etc. Moreover, various applications, components, programs, objects, modules, etc. may also execute on one or more processors in another computer coupled to computer 12, 14 via a network, e.g., in a distributed or customer-billing computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. For instance, the embodiment of FIG. 1 includes program code 42 configured to determine the usage of unreturned standby resources 18. Complementary program code 43 may reside on the billing side, but one of skill in the art should appreciate that embodiments consistent with the principles of the present invention may nonetheless use program code resident at only one, or any number of locations.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

As noted above, tracking of unreturned standby resource usage may be performed in a number of different computer architectures consistent with the invention. As an illustration of one particular architecture that may implement the herein-described functionality, FIG. 2 illustrates an implementation of computer 12 as a logically partitioned computer system 100. Computer 100 generically represents, for example, any of a number of multi-user computers such as a network server, a midrange computer, a mainframe computer, etc., e.g., an IBM eServer computer, within which logical partitioning is utilized. However, it should be appreciated that the invention may be implemented in other computers and data processing systems, so the invention is not limited to this particular implementation.

Computer 100 generally includes one or more processors 112 coupled to a memory 114 via a bus 116. Each processor 112 may be implemented as a single threaded processor, or as a multithreaded processor, such as with processor 112a, which is shown incorporating a plurality of hardware threads 119. For the most part, each hardware thread 119 in a multi-threaded processor 112a is treated like an independent processor by the software resident in the computer. In this regard, for the purposes of this disclosure, a single threaded processor will be considered to incorporate a single hardware thread, i.e., a single independent unit of execution. It will be appreciated, however, that software-based multithreading or multitasking may be used in connection with both single threaded and multithreaded processors to further support the parallel performance of multiple tasks in the computer.

In addition, as is also illustrated in FIG. 2, one or more of processors 112 (e.g., processor 112b) may be implemented as a service processor, which is used to run specialized firmware code to manage system initial program loads (IPL's), and to monitor, diagnose and configure system hardware. Generally, computer 100 will include one service processor and multiple system processors, which are used to execute the operating systems and applications resident in the computer, although the invention is not limited to this particular implementation. In some implementations, a service processor may be coupled to the various other hardware components in the computer in a manner other than through bus 116. As shown in FIG. 2, system processors may include standby processors 118, in addition to other temporary resources. When activated, these standby processors 118 may function within the computer as any other processor 112.

Memory 114 may include one or more levels of memory devices, e.g., a DRAM-based main storage, as well as one or more levels of data, instruction and/or combination caches, with certain caches either serving individual processors or multiple processors as is well known in the art. Furthermore, memory 114 is coupled to a number of types of external devices via a bus 120, e.g., one or more network adapters 122 (for interfacing the computer with network(s) 124), one or more storage controllers 126 (for interfacing the computer with one or more storage devices 128) and one or more workstation controllers 130 (for interfacing with one or more terminals or workstations 132 via a plurality of workstation adapters).

FIG. 2 also illustrates in greater detail the primary software components and resources utilized in implementing a logically partitioned computing environment on computer 100, including a plurality of logical partitions 134 managed by a partition manager 136. Any number of logical partitions may be supported as is well known in the art, and the number of logical partitions resident at any time in a computer may change dynamically as partitions are added or removed from the computer.

In the illustrated IBM eServer-based implementation, partition manager 136 is comprised of two layers of program code. The first, referred to herein as a non-dispatchable portion 138, is implemented within the firmware, or licensed internal code (LIC), of computer 100, which is utilized to provide a low level interface to various hardware components while isolating higher layers, e.g., the operating systems, from the details of the hardware access. The firmware may also communicate with a service processor such as service processor 112b. The non-dispatchable portion 138 provides many of the low level partition management functions for computer 100, e.g., page table management, etc. The non-dispatchable portion 138 also has no concept of tasks, and is accessible principally via function calls from higher layers of software.

The second layer of program code in partition manager 136 is referred to herein as a dispatchable portion 147. In contrast to non-dispatchable portion 138, which has no concept of tasks, is run with relocation off, and is accessible via function calls from higher layers of software, the dispatchable portion 147 has the concept of tasks (like any operating system), and is run with relocation on. The dispatchable portion typically executes in much the same manner as a partition, except that it is hidden from the user. The dispatchable portion generally manages higher level partition management operations such as creating and deleting partitions, concurrent I/O maintenance, allocating processors, memory and other hardware resources to various partitions 134, etc.

Each logical partition 134 is typically statically and/or dynamically allocated a portion of the available resources in computer 100, which may include either or both of dedicated and standby resources. For example, each logical partition may be allocated one or more processors 112 and/or one or more hardware threads 119, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each logical partition 134 utilizes an operating system 142 that controls the primary operations of the logical partition in the same manner as the operating system of a non-partitioned computer. For example, each operating system 142 may be implemented using the OS/400 operating system available from International Business Machines Corporation.

Each logical partition 134 executes in a separate, or independent, memory space, and thus each logical partition acts much the same as an independent, non-partitioned computer from the perspective of each user application (user app) 144 that executes in each such logical partition. As such, user applications typically do not require any special configuration for use in a partitioned environment.

Given the nature of logical partitions 134 as separate virtual computers, it may be desirable to support inter-partition communication to permit the logical partitions to communicate with one another as if the logical partitions were on separate physical machines. As such, in some implementations it may be desirable to support a virtual local area network (LAN) 146 in non-dispatchable portion 138 to permit logical partitions 134 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 147 that is separate from any partition 134, the functionality of the dispatchable portion may be incorporated into one or more logical partitions in the alternative. It will further be appreciated that the specific resources shown in FIG. 2 are merely exemplary in nature, and that any combination and arrangement of resources may be allocated to any logical partition in the alternative. Moreover, it will be appreciated that in some implementations resources can be reallocated on a dynamic basis to service the needs of other logical partitions.

The various software components and resources illustrated in FIG. 2 and implementing the embodiments of the invention may be implemented in a number of manners, including using various computer software applications, routines, components, programs, objects, modules, data structures and programs. Those skilled in the art will further recognize that the exemplary environments illustrated in FIGS. 1 and 2 are not intended to limit the present invention. For instance, it should be appreciated that the principles of the present invention may also apply to non-partitioned environments. Indeed, those skilled in the art will recognize that other alternative hardware and/or software environments may be used without departing from the scope of the invention.

Unreturned Resource Determination Function

Figure 3:
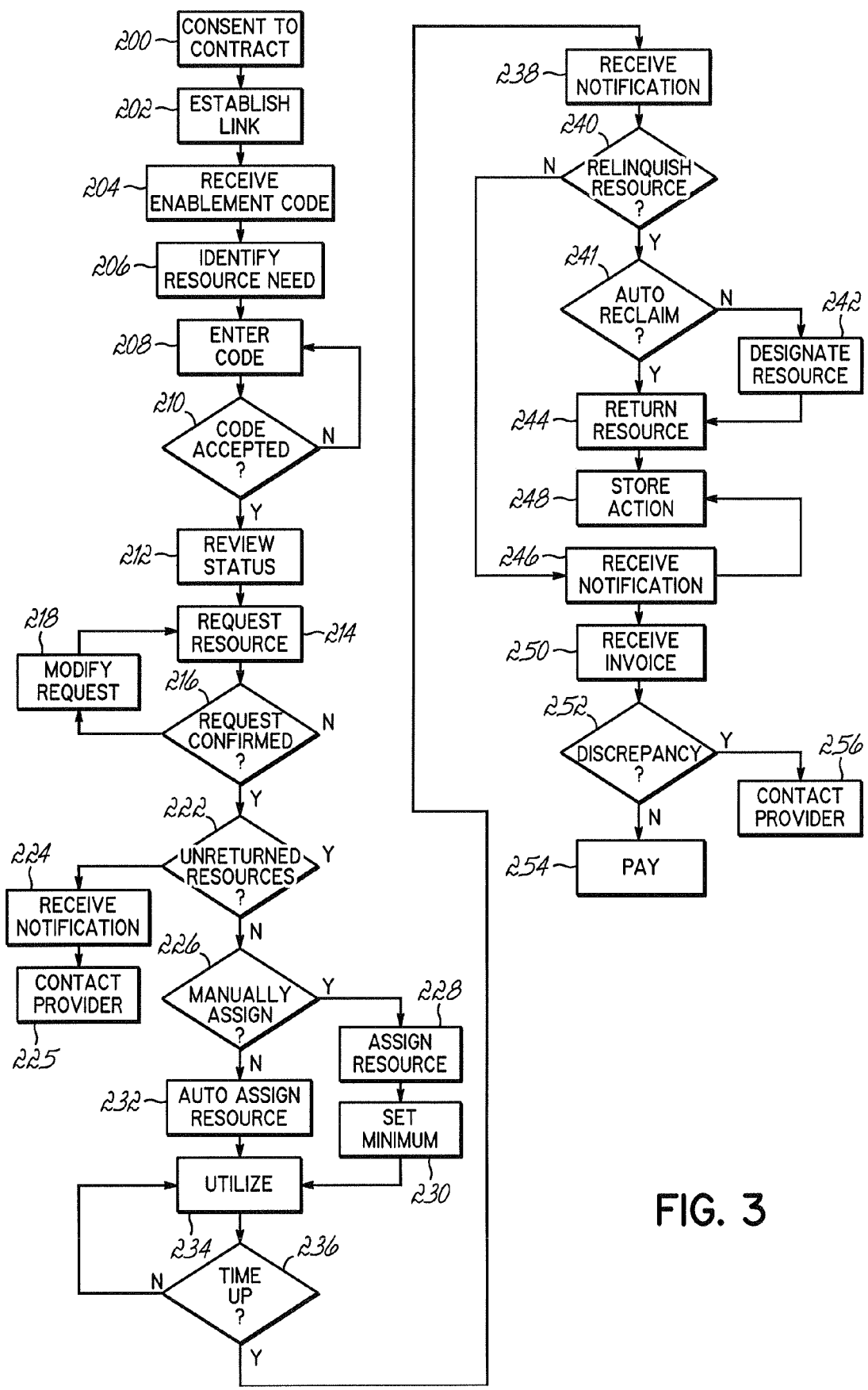
FIG. 3 is a flowchart having method steps suited for execution by a customer of FIG. 1.

The flowchart of FIG. 3 illustrates exemplary methods steps that are consistent with the principles of the present invention. The method steps of the flowchart are particularly suited for a user accessing standby resources 18 on a capacity on demand system 10 and 100, such as those described in connection with FIGS. 1 and 2, respectively. Generally, the illustrated process steps 200-256 of FIG. 3 initiate standby resource activation and usage determination processes in accordance with the principles of the present invention.

Blocks 200-204 of the embodiment of FIG. 3 include preliminary tasks and conditions that may function within certain applications consistent with the invention as prerequisites for usage determination. For instance, a user desiring capacity on demand services may initially sign a contract with a supplier at block 200. In so doing, the user may also agree to allow the supplier and/or their licensee to monitor resource usage. While such monitoring may be accomplished via faxed printouts from the customer computer 12 under exceptional circumstances, it typically includes the supplier accessing memory 19 and/or registers residing on the customer computer 12 via a network link.

To this end, the user may ensure that an Internet or other network link to their customer computer 12 is established at block 202. Such assurance enables the monitoring that may be contractually required during predetermined periods of operation. For instance, a billing computer 14 may use the network 36 to automatically access the program code 42 and/or memory 19 of the customer computer 12 on a monthly basis. That is, the program code 42 of one embodiment consistent with the invention may be configured to upload usage data in response to a billing inquiry.

Presuming compliance with all technical and contractual mandates stipulated at blocks 200-202, the provider may send an enablement code to the user at block 204. A typical enablement code comprises an alphanumerical sequence or some other password equivalent, but suitable enablement codes may further comprise a prearranged token/key and/or biometric mechanism. Where desired, the transmission of the enablement code, as well as the enablement code, itself, may be encoded in any manner as is known in the art. For instance, encoding may include synchronization mechanisms between the encoding and decoding software of the billing and customer computers, 14 and 12, respectively. Such precaution may bolster security and accommodate beneficial formatting of data.

At block 206, the user recognizes a current or impending need for increased processing resources. For instance, the user's baseline, or dedicated, compliment of four processors may be inadequate to handle an anticipated workload and schedule for a new project. As such, the user may elect to activate available standby resources 18 (comprising processors, for example) on their terminal to accommodate the increased workload. To this end, the enablement code provided to the user at block 204 may be entered by the user into the customer computer 12 at block 208 in order to initiate activation of the standby resources 18.

One of skill in the art will appreciate that the user may enter the enablement code at anytime during a capacity on demand session, and the insertion of the enablement entry at block 208 relative to the remaining steps of the flowchart is for exemplary purposes only. As with all of the steps of the flowchart of FIG. 3, as well as those that follow, step 208 may be rearranged, omitted or augmented within the flowchart while remaining in accordance with the principles of the present invention. For instance, program code 42 of another embodiment that is consistent with the invention may cause the billing computer 14 to automatically download the enablement code to the customer computer 12 without requiring effort by the user.

An authentication program 51 on a smart chip or other component of the customer computer 12 may verify the enablement code at block 210. Assuming the enablement code is authenticated at block 210, the user may be presented with a status display at block 212. The status display may apprize the user of information regarding standby resource activity and availability. For instance, the status display may confirm for the user that four standby resources 18 are currently available for activation, while two others are already in use.

Such status information may alternatively or additionally be presented to the user when making a request for standby resource activation. The user initiates such a request at block 214 of FIG. 3. That is, the user initiates a request at block 214 configured to bring about activation of one or more standby resources 18. The request typically is received and processed by program code 42 of the customer computer 12, which activates and assigns the requested standby resources 18 using customer input and the partition manager 136. However, the billing computer 14 of another embodiment consistent with the invention may alternatively initiate activation of standby resources 18 in response to receiving a similar request from the user.

FIG. 4 shows an exemplary display 300 comprising a standby resource request. The display 300 includes fields 302-310 suited to receive user input. The input may reflect the short term processing requirements of the user. The display may further include status information relating to current and past resource usage for reference by the user. For example, field 302 of FIG. 4 shows that the customer computer 12 has eight dedicated processors. The user may enter a number of standby processors/resources 18 to be requested in input field 304, up to the number displayed in field 306 of FIG. 4.

Field 305 of FIG. 4 may be used to specify the period(s) of activation for all of the requested standby resources 18. One of skill in the art will appreciate that the display 300 of another embodiment consistent with the invention may allow the user to assign periods of activation per individual standby resources 18. Moreover, while typical such periods comprise days, any time increment may be substituted in accordance with the principles of the present invention. In some embodiments that are consistent with the invention, the program code 42 tracks resource utilization in terms of processing or memory measurable units or capacity, irrespective of or in addition to actual days of use. Such activation terminology and practices may further transfer into billing practices, where a billable unit, or day, may comprise any measurable resource performance characteristic.

The exemplary display 300 of FIG. 4 additionally includes historical data relating to any unreturned and requested resources 18 at fields 308 and 310, respectively. Where so configured, the user may cancel or initiate further execution of the request by either pressing "F8" or "ENTER," for instance. For marketing, efficiency and user convenience considerations, embodiments consistent with the invention may include preconfigured standby resource purchase scenarios within a display. For instance, the user may click or otherwise indicate a field or button to select a first, preconfigured option presented on the display 300. As shown in FIG. 4, the first option includes activating three standby resources 18 for ten days each. Such an option may include similar content to a previous user request. A user of another embodiment consistent with the invention may create and customize additional canned purchase scenarios to better match their own, unique requirement trends.

Prior to processing the request, the customer computer 12 may prompt the user to confirm the particulars of the request at block 216. For instance, the user may review a display that reads, "Please press F1 to confirm your request for four processors for ten days each, or F2 to change the request." Thus, the user may modify or cancel the request at block 218.

Should the user alternatively wish to continue with their original request at block 214, program code 42 at block 222 may determine if any standby resources 18 are currently unreturned. To this end, the program code 42 may check a register or other memory 19 of the customer computer 12 tracking resource dispatches to ascertain the current number of unreturned standby resources 18. Such a feature may be implemented where the presence of an unreturned resource 18 affects the subsequent availability of the remaining standby resources 18. For instance, policy and program code 42 of one embodiment consistent with the invention conditionally prevents a user from activating additional standby resources 18 at block 225 while other standby resources 18 remain unreturned at block 222. Instead, the program code 42 at block 224 may issue a notification to the user at the customer computer 12 advising them to first return one or more of the outstanding resources per policy specifications.

Where the program code alternatively determines at block 222 of FIG. 3 that no standby resources 18 are unreturned, the request of block 214 may be processed by the program code 42. Where so configured, the user may assign requested standby resources 18 at blocks 226 and 228. For instance, the user may assign standby resources 18 to particular partitions 134 as needed at block 228.

The exemplary display 400 of FIG. 5 shows an interface for use in assigning standby resources 18 to the customer computer 12 in accordance with the principles of the present invention. The display 400 may include identification of the customer computer 12, as well as a field 402 where a user may designate the name or other identifier of the partition 134 they wish to receive one or more of the requested standby resources 18. As such, an embodiment consistent with the invention may include multiple such displays 400 for different partition assignments. In the display of FIG. 5, the same or another field 408 may allow the user to allocate the requested standby resources 18 to the shared processor pool. As discussed herein, the shared processor pool may act as a universal resource that each of partitions 134 may use for processors as needed.

At block 406 of the display 400 of FIG. 5, the user may specify a minimum number of standby resources 18 for a partition 134 or pool designated in fields 402 and 408, respectively. This minimum number may represent the number of standby resources 18 that the user minimally requires and/or desires to be active at a given partition. The user may thus assign the minimum number as a function of a partition's current or anticipated workload. In embodiments consistent with the invention, program code 42 may, but typically will not automatically reclaim the number of standby resources 18 designated as minimally necessary. For instance, a number of minimally designated standby resources may be communicated to the billing computer 14 separately or in aggregate. Thus, despite their unreturned status, the program code 42 of one embodiment consistent with the invention will not interrupt the activity of unreturned standby resources 18. This feature prevents loss and interruption of processes critical to the user. Conversely, and as discussed below in greater detail, the program code 42 may be permitted to recover a number of unreturned resources that have not been minimally designated without substantially interrupting operations.

In terms of FIG. 3, block 230 reflects where a user may designate standby resources 18 as being critical. While the flowchart of FIG. 3 shows the user designating the minimum number of standby resources 18 prior to activation/utilization at block 234, it will be appreciated by one of skill in the art that a user may change such a designation in response to a changing condition at any time during a capacity on demand operation.

A user or provider may alternatively prefer that requested standby resources 18 be automatically, rather than manually, assigned at block 232 of FIG. 3. As such, program code 42 may assign the requested standby resources 18 at block 232 per system 10 protocol without requiring direct user attention. This feature may be particularly beneficial in certain applications where the program code 42 can effectively monitor and assign resources, and/or in systems having high frequencies of standby resource requests.

In either case, the user may utilize at block 234 the standby resources 18 requested and assigned at blocks 226-232. The user may thus access the requested standby resources 18 in a manner identical or similar to that regarding the baseline processors 16 of the customer computer 12. More specifically, the user may utilize the standby resources 18 as normal until the requested duration of the standby resources 18 expires at block 236. At such time, the user may receive at block 238 notification of the expiration or pending expiration of one or more standby resources 18.

Where not automatically recovered by program code 42 at block 241, the user may elect to relinquish unreturned standby resources 18 at blocks 240. In one embodiment consistent with the invention, the user may designate at block 242 a partition 134 and/or standby resources 18 to be returned using processes similar to those used originally to assign the standby resources at blocks 228-230. Where desired, such return processes may include a display similar to that of FIG. 5.

In either case, the user may capitulate to the return of standby resources 18 at block 244. The relinquishment of the unreturned standby resources 18 may be recorded at block 248 for accountability purposes. Where so configured, the return action is recorded locally at the customer computer 12 and/or remotely at the billing computer 14.

The user may alternatively decline relinquishing unreturned standby resources 18 at block 240. As discussed herein, this decision may be imputed automatically from minimum designations and other settings made at block 230. Notification of the user's presumed intent to decline return of standby resources 18 may be reviewed by the user for confirmation and/or accountability purposes at block 246. Such notification may include a text message apprizing the user of an elevated or otherwise changed billing rate with regard to the unreturned standby resources 18. Recording of the notification and the user's decision may be accomplished at block 248.

Some period later, the user may receive and review an invoice from the provider at block 250. For instance, an electronic mail invoice may arrive via the network 36 at the customer computer 12. The user may use records stored locally at the customer computer 12 to verify the accuracy of the invoice particulars at block 254. Where desired, program code 42 may automatically conduct such a comparison. Thus, the user may then either pay the invoice or contact the provider or their agent at blocks 254 or 256, depending on the outcome of the determination.

Figure 6:
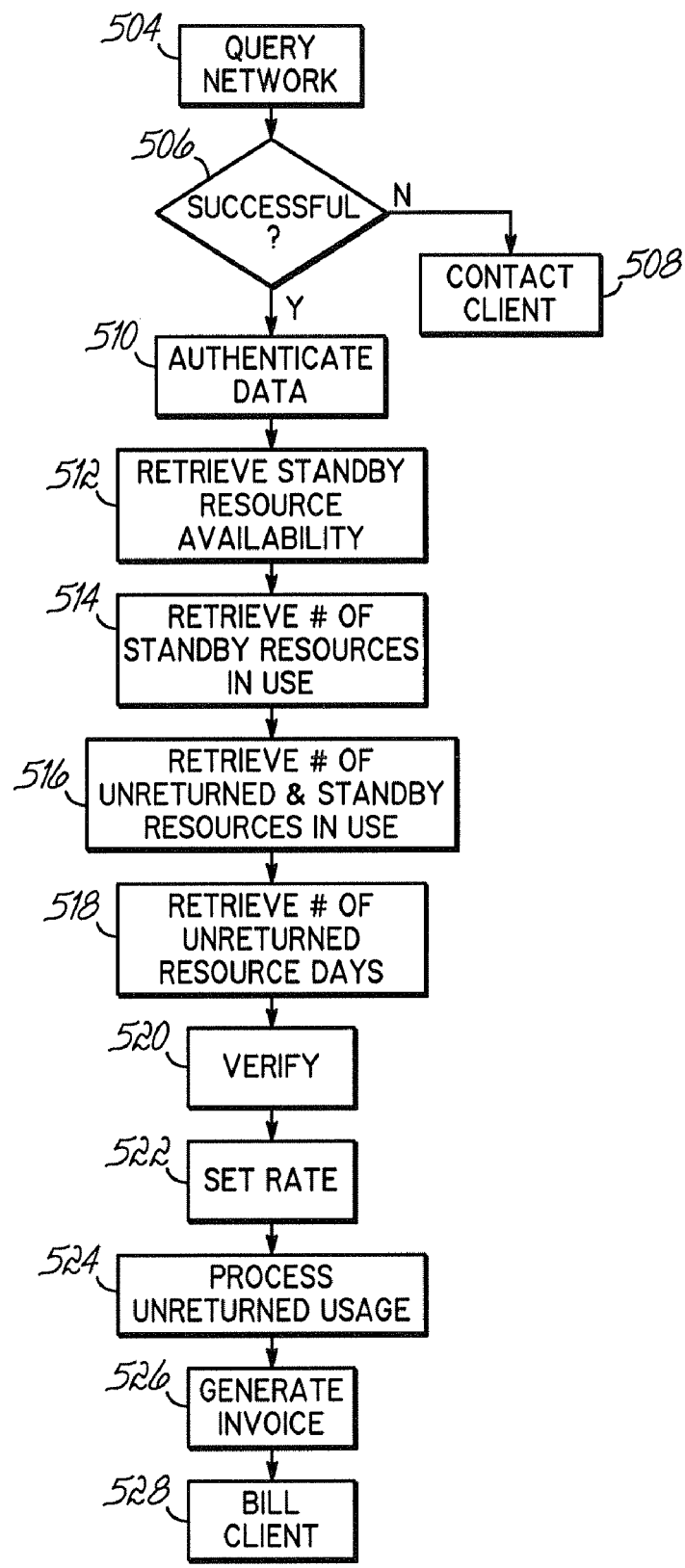
FIG. 6 is a flowchart having method steps suited for execution by a billing computer of FIG. 1.

FIG. 6 shows a flowchart having process steps suited for execution by the billing computer 14 of FIG. 1. More particularly, the exemplary method steps regard actions that may be taken by program code 43 of the billing computer 14. The program code 43, in one respect, determines and accounts for unreturned standby resource usage on the customer computer 12. At block 504, the program code 43 may attempt to query software and/or hardware of the customer computer to initiate a determination process. Such a query may presume that a contract and necessary communication links between a customer and the provider have been established. As such, the query attempt of block 504 may involve a network communication. The communication may include programmatic instructions and/or codewords, and may further coincide with a billing cycle. For instance, such queries may be periodically conducted on a monthly and/or a daily basis.

Where the billing computer 14 is unsuccessful in accessing the software and/or memory 19 of the customer computer 12 at block 506, the provider may attempt to contact the user at block 508 via another communication mechanism. For instance, the provider may fax, write or telephone the user to inform them of the broken communication link and any consequent change in service. Conversely, a successfully established link at block 506 may be authenticated by the billing computer 14 at block 510. Such authentication techniques may involve encoded transmission techniques that are known to those of skill in the art.

The billing computer 14 may query memory 19 of a smart card or other component of the customer computer 12 at blocks 512-518. For instance, the billing computer 14 may retrieve a number from the memory 19 corresponding to the number of standby resources 18 currently available to the user at block 512. Similarly, the billing computer 14 may retrieve data from the customer computer 12 at block 514 that is reflective of the number of standby resources 18 currently active within the customer computer 12. At block 516, the billing computer 14 may sample data indicative of the number of unreturned standby resources 18 that are active on the customer computer 12.

Another step at block 518 concerns retrieving a running or total count of outstanding/unreturned resource days or other billable unit of measurement. As described in greater detail in connection with FIG. 8, the number of unreturned resource days may be determined by incrementing a count for each day a standby resource remains unreturned. While such a determination is typically accomplished at the customer computer 12, the number of unreturned resource days of another embodiment consistent with the invention may be determined actively by the billing computer 14. For instance, program code 43 of such an embodiment may process other information retrieved from the customer computer 12 and/or local billing memory 28 to determine unreturned resource usage.

FIG. 7 shows the content of an exemplary report 600 suited for retrieval by the billing computer 14 at blocks 510-518 of FIG. 6. The serial number 614 and type 615 of the customer computer 12 may be listed in the report 600. The report 600 may further include the number of system processors 602, as well as the number of unreturned and available standby processors in fields 604 and 608, respectively. Where desired, the report 600 includes historical data regarding requested and unreturned processor days, 610 and 612, respectively. While the fields 602-615 of the report 600 of FIG. 7 and blocks of 510-518 of FIG. 6 may have particular application with regard to certain embodiments of the present invention, one of skill in the art will appreciate that other data may alternatively and/or additionally be communicated to the billing computer 14 in accordance with the principles of the present invention.

Some or all of the data retrieved from the customer computer 12 at blocks 510-518 of FIG. 6 may be automatically compared at block 520 to data stored locally at the billing computer 14. Where implemented, this feature may provide an additional layer of reporting accuracy. For instance, the provider may manually address any discrepancies by inspecting the customer computer 12. In any case, the number of unreturned processor days retrieved at block 518 of FIG. 6 is processed at block 524. For instance, the number of unreturned processor days may be multiplied by a billing rate set at block 522 by the provider. Such a billing rate may vary from a normal operating rate for standby resources 18 not sharing an unreturned status. As such, an embodiment of the present invention provides a manner of discerning unreturned resource usage from that of other, expected standby resource usage. The ability to account for and distinguish the unreturned standby resource days permits discerning billing practices that allow, for instance, the unreturned resource days to be billed out at a higher or otherwise different rate than other standby resource days.

A billable amount determined at block 524 may then be combined along with other invoice data at block 526. For instance, a customer invoice produced at block 528 may include both unreturned resource day data and expected usage data that is correlated to standby resource days rented at a regular rate.

Figure 8:
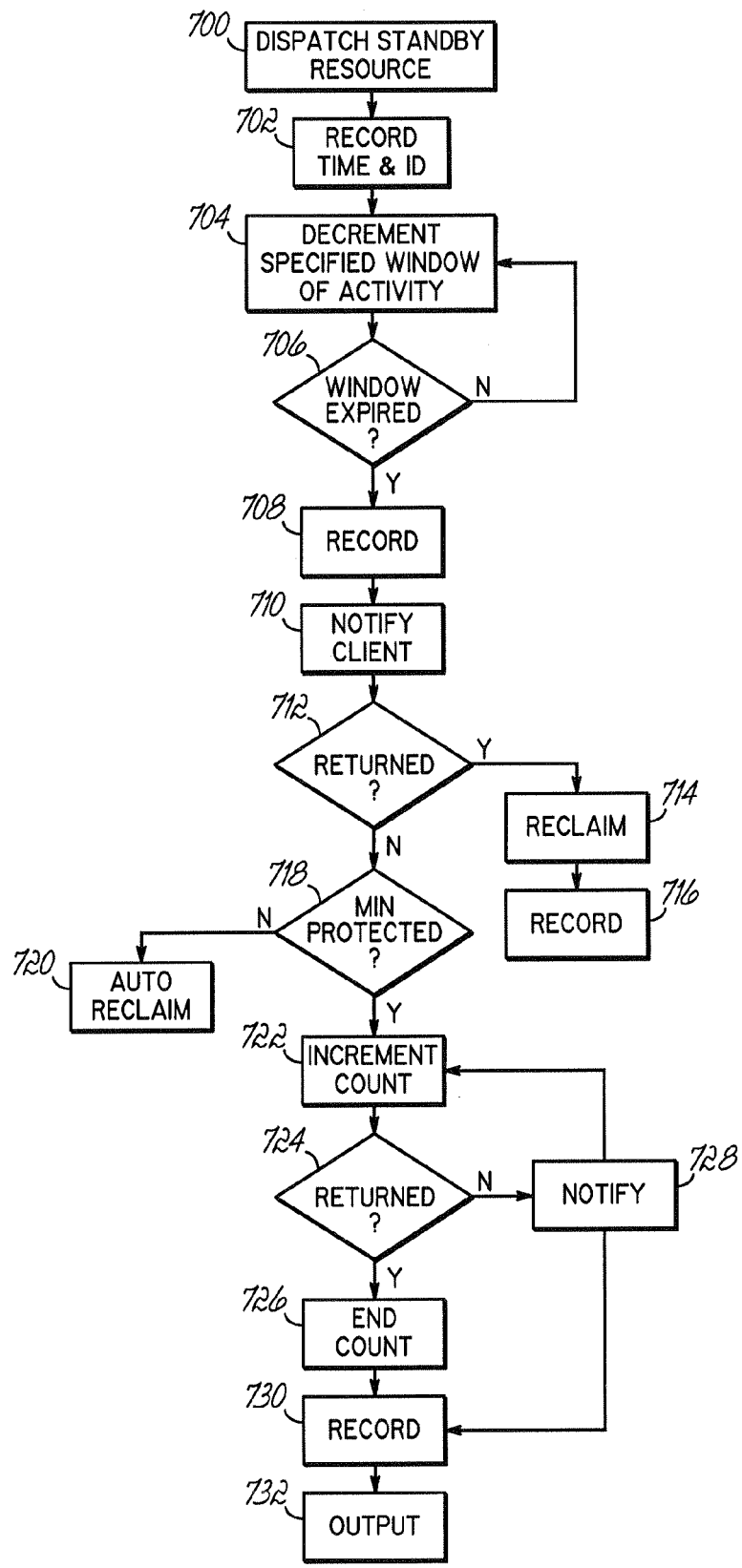
FIG. 8 is a flowchart having method steps suited for determining unreturned resource usage on the customer computer of FIG. 1.

FIG. 8 is a flowchart having method steps suited for execution by the computer system 10 of FIG. 1. More particularly, the steps are configured to determine unreturned resource usage in a manner that is consistent with the principles of the present invention. The customer computer 12 typically accomplishes the process steps 700-732 of FIG. 8. For instance, program code 42 of the customer computer 12 may initiate activation of requested standby resources 18 at block 700. As discussed herein, the processes of block 700 may include prompting the user to assign a standby resource 18 to applicable partitions 134, as well as initiating dispatch processes of the partition manager 136.

At block 702, the program code 42 may initiate storage of the particulars of the standby resource request of block 700. Such particulars may include the number, identifier, duration and dispatch time of the requested standby resources 18. A counter program and/or a register of the customer computer 12 may begin decrementing the time corresponding to the duration of the purchased standby resources 18 at block 704. That is, the time contractually prearranged for an activated standby resource may run down at block 704 until it expires at block 706.

Expiration of the duration of the activated standby resource 18 may be recorded at block 708, and the program code 42 may initiate notification to the user of its expired status at block 710. Following this notification of block 710, the program code 42 may receive instructions from the user to relinquish unreturned standby resources 18 at block 712. Where the user releases the standby processes, the program code 42 will reclaim them at block 714. Where desired for accountability purposes, the reclamation of the standby resources 18 is recorded at block 716 as expected resource usage.

Should the unreturned standby resources 18 not be voluntarily be surrendered at block 712, then the program code 42 may determine at block 718 of FIG. 8 whether the unreturned standby resources 18 are protected under a minimum designation. Such a designation may be assigned by a user to ensure uninterrupted processing for critical applications. In another example, an operating system or malicious program running in a partition may prevent reclamation of a standby resource 18. One of skill in the art will appreciate other scenarios and settings exist where such reclaiming limitations may be invoked at block 718. Where such protections and/or settings are not in place, a system policy may allow the program code 42 to automatically reclaim a number of unreturned resources 18 at block 720. While such protections as afforded by minimum settings may be advantageous in certain contexts, it will be understood by one of skill in the art that other embodiments consistent with the invention may reclaim unreturned standby resources 18 irrespective of such settings. Such a condition may arise where a customer has refused to comply with provider guidelines.

Conversely, where an unreturned standby resource 18 remains unreclaimable at block 718, then the program code 42 may initiate a recorded count at block 722 for each unreturned standby resource. The count may increment at block 722 to coincide with the passage or realization of a billing occurrence. As discussed herein, a suitable billable occurrence may comprise a cycle, software prompt, and/or any measurable characteristic of resource performance, but typically include days of operation, or some other temporal metric. The customer computer 12 may display notification of the incrementing of block 722 to the user where appropriate at block 728. The count may continue to increment in this manner until the unreturned standby resource 18 is recaptured at block 724. Return of the outstanding standby resource at block 724 ends the advance of the count at block 726.

In either case, the count may be maintained within memory 19 of the customer computer 12 in a manner that is accessible to the billing computer 14. Furthermore, the count is representative of the aggregate number of unreturned resource days. As such, the customer computer 12 of one embodiment consistent with the invention may initiate output of the unreturned standby resource usage to the billing computer 14 at block 732. Where so desired for processing or other considerations, program code 43 of the billing computer 14 may retrieve only an aggregate number representative of all unreturned resource usage, irrespective of individual standby resource data.

While the present invention has been illustrated by a description of various embodiments and while these embodiments have been described in considerable detail, it is not the intention of the applicants to restrict, or in any way limit, the scope of the appended claims to such detail. For instance, while networked communication links may present a most advantageous medium for information exchange in one embodiment of the present invention, another embodiment consistent with the invention may rely on other mechanisms. For instance, a business may print out a usage report using program code 42 of the invention. The report may be subsequently faxed or mailed to the provider or the provider's agent. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus comprising:
a computer including a standby resource comprising an allocatable component configured to affect the functionality of the computer and to be selectively activated to address a computing need and having a specified window of activity; and
program code in communication with the computer, the program code configured to determine expected usage data of the standby resource operating within the specified window of activity, as well as unreturned usage data of the standby resource operating outside of the specified window of activity, the program code further configured to process the unreturned usage data of the standby resource separately from the expected usage data of the standby resource, and to output the processed unreturned usage data, wherein the program code initiates restricting the activity of a second standby resource in response to determining the unreturned resource usage.

2. The apparatus of claim 1, wherein the program code initiates a count associated with the unreturned usage data in response to the standby resource operating outside of the specified window of activity.

3. The apparatus of claim 2, wherein the program code initiates incrementing the count in response to detecting a measurable billing occurrence.

4. The apparatus of claim 3, wherein the measurable billing occurrence includes at least one event selected from a group consisting of: a time unit, a day, a processor cycle, a software prompt and resource usage.

5. The apparatus of claim 1, wherein the program code initiates storing a record of the standby resource operating outside of the specified window of activity.

6. The apparatus of claim 1, wherein the program code initiates processing the unreturned usage data as a function of a billable cost per measurable unit.

7. The apparatus of claim 1, wherein the program code initiates storing the unreturned usage data separately from the expected usage data.

8. The apparatus of claim 1, wherein the program code initiates communicating the processed unreturned usage data to a billing computer.

9. The apparatus of claim 1, wherein the standby resource includes at least one computing resource selected from a group consisting of: a processor, memory, an interface, an input/output controller, an adaptor, a hardware device and a card.

10. The apparatus of claim 1, wherein the program code initiates determining that the standby resource is unreclaimable.

11. The apparatus of claim 1, wherein the program code initiates designating the standby resource as unreclaimable.

12. The apparatus of claim 1, wherein the computer is a logically partitioned computer.

13. The apparatus of claim 1, wherein the standby resource comprises at least one of a processor or a memory asset.

14. A non-transitory computer recordable medium bearing a program product, comprising:
program code configured to determine expected usage data of a standby resource comprising an allocatable component configured to affect the functionality of a data processing system executing the program code and to be selectively activated to address a computing need and operating within a specified window of activity, as well as unreturned usage data of the standby resource operating outside the specified window of activity, the program code further configured to process the unreturned usage data of the standby resource separately from the expected usage data of the standby resource, and to output the processed unreturned usage data, wherein the program code initiates determining that the standby resource is unreclaimable without interrupting the standby resource.

* * * * *